…

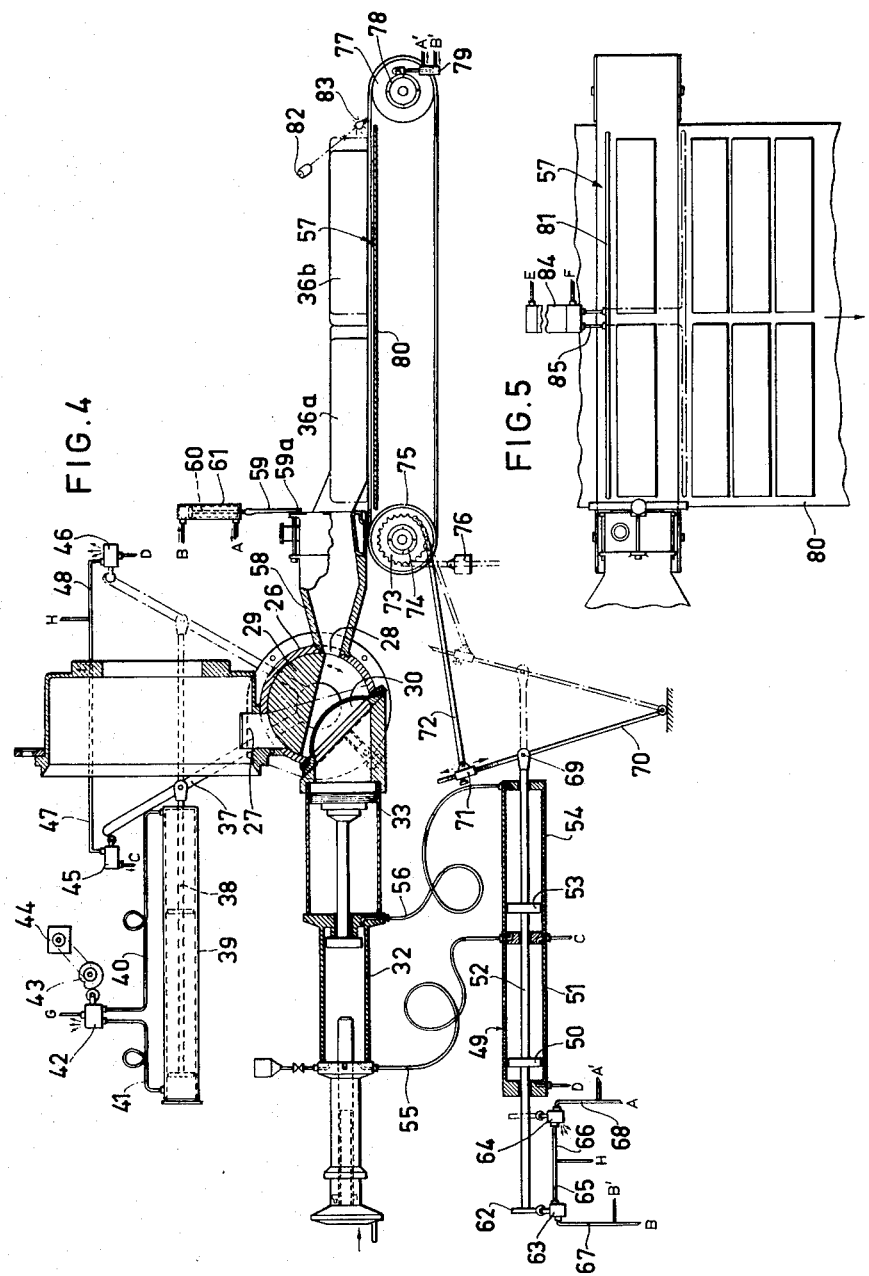

United States Patent Office 3,207,089
Patented Sept. 21, 1965

3,207,089
DOUGH BEATER
Nemo Sixten Mauritz Ivarson, Johanneshov, Sweden, assignor to Kooperativa Förbundet Ekonomisk Förening, Stockholm, Sweden, a Swedish joint-stock company
Filed May 28, 1962, Ser. No. 198,007
Claims priority, application Sweden, June 1, 1961, 5,776/61
8 Claims. (Cl. 107—4)

This invention relates to a dough beater.

The production of certain bread qualities, such as tin loaf and crisp bread of delicacy type, requires the admixture of air and stretching of the dough for obtaining a product of the desired characteristic airiness and consistency.

This invention is intended to achieve this object in a simple and continuous way by means of a dough beater which is substantially characterized in that it comprises an extended cylinder having at one end portion an inlet and at the opposite end portion an outlet for dough supplied from a dough mixer, and including preferably a plurality of working sections communicating with one another, each of said sections comprising an inlet portion with increasing diameter from the inlet and in connection therewith a continuously tapering outlet portion, a rotary shaft extending longitudinally of the cylinder with clearance between its outer surface and the section transitions, the shaft supporting in the inlet zone of each section at least one blade projecting in the radial plane, and the outline of the blade corresponding to the widening inside of said inlet portion and spaced therefrom by a gap.

Figure 1:
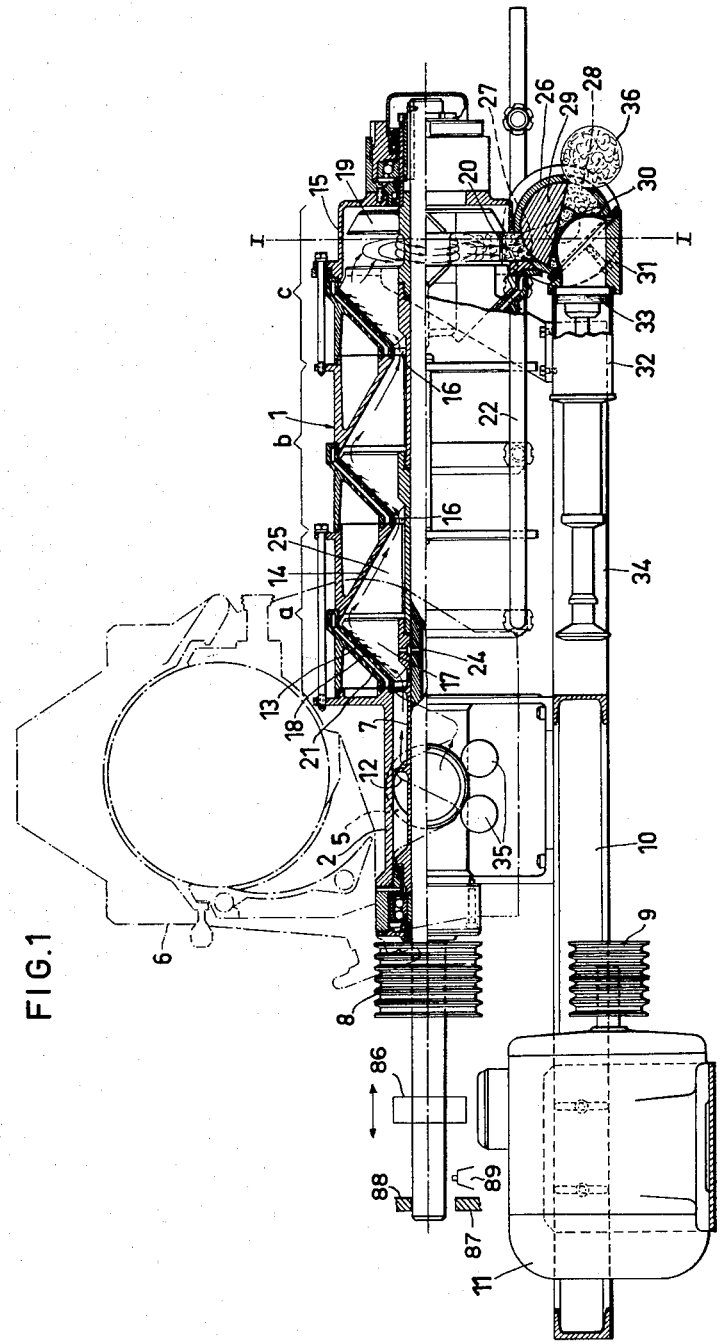
Figure 2:
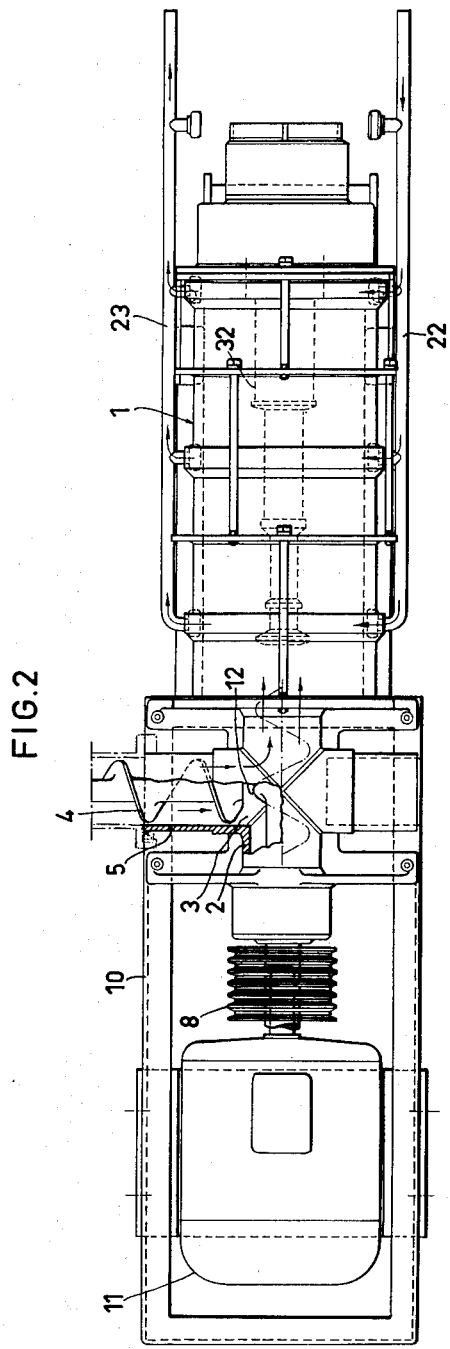
Figure 3:
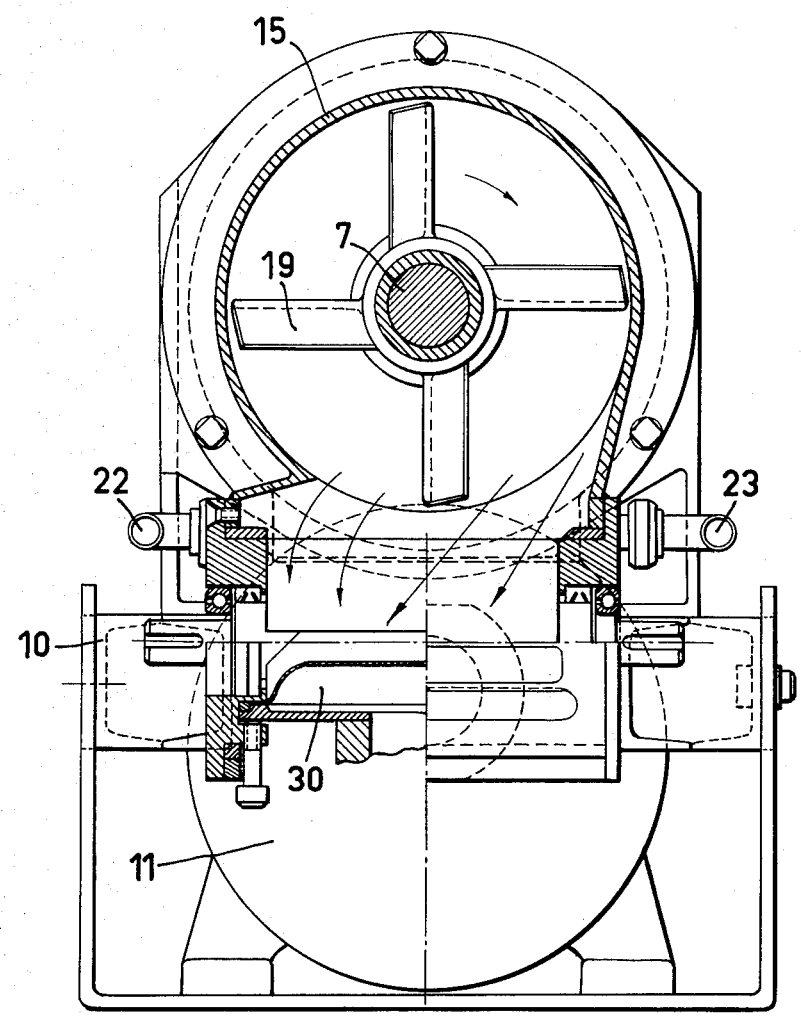

The invention is described in the following in greater detail, reference being had to the accompanying drawings whereon FIG. 1 shows a vertical view, partially in a longitudinal section, of the dough beater according to the invention applied to the preparation of tin loaf, FIG. 2 is a horizontal view of the dough beater, FIG. 3 is a cross-section along the line I—I in FIG. 1, FIG. 4 is a schematic view of the discharge means of the dough beater with associated guide means, drive means and conveyor, and FIG. 5 is a horizontal view of the conveyor arrangement in FIG. 4.

The main portion of the dough beater comprises a stationary cylinder 1 having an inlet portion in the form of a tubular portion 2 with a lateral inlet 3 (FIG. 2), the inlet portion being connected to a tube 5 with a feed screw 4 enclosed therein, which tube 5 communicates with the outlet of a dough mixer 6 indicated by dash-dot lines. A hollow shaft 7 which runs through the entire length of the cylinder 1 and is in rotary attachment to the ends of the cylinder, is adapted to be driven via a pulley 8 from driving pulley 9 of a motor 11 mounted in a frame 10 rigidly secured to the inlet end of the cylinder.

As appears from the figure, the hollow shaft 7 is constructed of a plurality of portions or sections in subsequent screw threaded attachment to one another. The portion of the shaft 7 within the tubular portion 2 at the inlet end of the cylinder supports a worm sector 12 for conveying the dough supplied from the dough mixer 6 to the cylinder proper. The cylinder comprises several sections a, b and c, each section including an outlet portion 14 conically tapering from the inlet, with the exception of the final section c which has a cylindrical outlet portion to form an outlet chamber 15. Between the outer surface of the hollow shaft 7 and each section transition, there is a free annular space 16. The hollow shaft 7 supports at each inlet portion 13 radially projecting blades 17 having outlines corresponding to the conical inside of the inlet portion, which blades are, however, spaced from the inside by a narrow gap 18. The inlet portion 13 is shown to have a cone angle greater than that of the outlet portion 14 of each section.

In the cylindrical outlet chamber 15 forming the outlet portion of the cylinder section c, the hollow shaft 7 supports an impeller 19 adapted to force the dough around and towards a downwardly located outlet 20 of the chamber.

As appears from FIG. 1, the wall which forms each inlet portion 13 is constructed as a cooling jacket with a gap 21 through which cooling medium is circulated from an inlet pipe 22 which is common to all cooling jackets to an outlet pipe 23 (FIG. 2) also common to all cooling jackets.

The hollow shaft 7 has a radial channel 24 opening into each inlet portion 13 and communicating with the outside air.

By means of the aforedescribed device, dough for bread of delicacy type can be conditioned in the following manner:

Dough is supplied from the dough mixer 6 via the worm 4 to the inlet pipe 2 of cylinder 1 and therefrom via the worm 12 to the inlet for the inlet portion 13 of the cylinder section a. The dough pressed into the inlet is beaten around by the blades 17 which throw the dough upwards along the conical inside of the inlet portion 13. As a result of the narrow gap 18 between the inside and the outline of the blade 17, the dough is smoothed continuously on its way upwards for obtaining the stretching effect required for the desired bread quality. At the same time, air is whipped into the dough, including the air following with the dough from the beginning as well as air drawn in continuously through the radial channel 24.

The dough which after its working runs out at the upper edge of blade 17 is pressed continuously along the outlet portion 14 of section a, which has a considerably smaller cone angle than the inlet section, downwards to the inlet of the next following cylinder section b where the dough is worked again in the same manner as in section a. In the embodiment shown, the outlet portion 14 is provided with radial guide bars 25. The greater the number of sections, the more intensive is the working of the dough, and the greater is the capacity of the dough beater in its entirety. After its final working in the inlet portion 13 of section c, the conditioned dough is discharged into the cylindrical outlet chamber 15 where it is beaten about by the impeller 19 and blades 17 and forced out through the chamber outlet 20, such as by means of a spray nozzle, to the collecting vessel of the machine forming the dough into crisp bread cakes of delicacy type.

By completion of the aforedescribed dough beater with a special means in the form of a dough divider, the dough beater is adapted for use in the production of tin loaf portions of desired size.

The dough divider which is rigidly attached to cylinder 1, comprises a cylindrical housing 26 which is cut away along a chord to form a segment and provided upwardly with an opening 27 communicating with the outlet 20 of the cylinder chamber 15, and a slot 28 arranged in the lower righthand portion (according to the figure) of the housing being intended for discharging the dough portion therethrough. Within the cylindrical housing 26 there is a rotary valve 29 of substantially semicircular cross-section and rotatable in the circumferential direction of the housing with a slip fit to the inside of housing 26. The rotary valve which is driven separately oscillates when in operation between two end positions. In one of these end positions (continuous lines) the valve covers the inlet opening 27 of the housing 26 and exposes the outlet slot 28, while in the other end position (dash-dot lines) the valve exposes the inlet opening 27 and covers the outlet slot 28. The valve movements are controlled as described below.

An elastic diaphragm 30 secured to the chord portion in the lower left-hand portion of the housing 26 separates sealingly the interior of the housing from a bevelled pipe socket 31 connected with the chord portion and communicating with a pump 32 of known type, the pump having a piston 33 with an adjustable stroke length. The pump is mounted on an extension 34 of frame 10 carrying the motor 11 and presses at each stroke oil against the diaphragm 30, so that the diaphragm is expanded to the condition shown in FIG. 1. The piston and valve movements are synchronized in such a manner that the diaphragm is expanded at the first of the end positions of the rotary valve and returns to its plane condition at the other end position of the rotary valve.

The entire unit comprising the dough beater and the dough divider is pivoted about a horizontal shaft at the center of tubular portion 2 of the cylinder inlet, for example by means of stationary pulleys 35 in abutment to the lower surface of pipe 5 and the lower surface of the tubular portion 2 and the corresponding pipe on the opposite side of tubular portion 2. The state of balance of the entire unit can be controlled by loads such as a counterweight 86 placed on the left-hand end (according to FIG. 1) of shaft 7, with the pivoting of the unit being limited by fixed stoppers 87 and 88 outside the movable unit.

The pivoted unit is balanced so that in normal operation with a continuously operating dough divider the unit is pivoted downwards into its lower boundary position. In order to prevent packing of the dough in the outlet chamber 15 of the cylinder, the dough divider is driven with a capacity somewhat exceeding that of the dough beater. If, however, this overcapacity of the dough divider causes a decrease of the dough contained in the chamber 15 below a certain limit, the unit, due to the change in the state of balance leaves the stable lower boundary position and is pivoted upwards into the upper boundary position. In this position the unit is adapted to actuate a limit switch 89 for interrupting the function of the dough divider and thus also of the pump 32. As soon as there is again a sufficient quantity of dough in the chamber 15, the unit is again moved downwards into the stable working position, thereby actuating the limit switch to put the dough divider in operation.

The overcapacity of the dough divider relative to the feed worm of the cylinder should preferably be the lowest possible, in order to prevent too frequent interruptions in the operation of the dough divider. How this can be achieved, will be described below.

The dough divider operates in the following manner:

It is assumed from the beginning, that the housing 26 is empty and that the rotary valve 29 has performed the first phase of its working cycle, i.e. the valve occupies the end position indicated in FIG. 1 by dash-dot lines. Dough supplied from cylinder 1 via the exposed inlet opening 27 of the housing 26 may fill the space between the plane side of the rotary valve 29 and the diaphragm 30 which is now in a plane condition, the outlet slot 28 of housing 26 being covered by the rotary valve 29. During the second phase of its working cycle the valve 29 is rotated in anti-clockwise direction into its opposite end position thereby covering the inlet opening 27 of the housing whereby the dough strand running through the opening is cut and the outlet slot of the housing is exposed. By means of the previously mentioned synchronization which will be described in greater detail later on, the pump 32 is caused to carry out its working stroke whereby the diaphragm is pressed outwards and forces a quantity of dough corresponding to the stroke length of the piston 33 out of the housing 26 through the outlet slot 28 (the condition indicated in FIG. 1 by continuous lines) where it remains suspended in the form of a lump 36. When the rotary valve 29 will now carry out the first phase of its working cycle, i.e. when it by rotation in clockwise direction returns to the position shown by dash-dot lines, the valve with its (in the figure right-hand) sharp edge will cut off the dough strand filling the outlet slot 28 between the dough lump 36 and the dough mass remaining in the housing. At the same time, the inlet opening 27 of the housing is again exposed, whereafter by means of the synchronization the diaphragm 30 is caused to restore its plane condition, thereby drawing down another dough portion from the chamber 15 to the space between the plane side of the valve and the diaphragm. Thereafter, the aforedescribed cycle is repeated.

By means of the previously mentioned control of the state of balance of the unit with the help of loads, it is obviously possible to vary the mixing intensity of the dough beater. When, for example, more load is put on the left-hand end of shaft 7 (according to FIG. 1), the normal working condition with the unit pivoted downwards into the lower boundary position is restored when the filling degree of cylinder 1 is increased.

By adjusting the stroke length of piston 33 of pump 32 it is possible to determine the size of the dough portions 36 discharged in every case to be applied in forms for baking tin loaf.

It is understood that the aforedescribed arrangement is fully automatic and that it may advantageously be combined with forms placed on a conveyor belt mounted below the outlet slot 28 of the housing and advanced in synchronism with the operation of the dough divider. It is further possible to produce dough strands for loaves of accurately measured size in an automatic way by connecting a nozzle to the outlet slot of the dough divider housing in such a manner that a conveyor belt mounted below is adapted to be advanced intermittently in synchronism with the operation of the dough divider and such conveyor belt moves the strand of dough which thereafter is cut off while the conveyor belt is inoperative.

An example of a suitable arrangement for the dough preparation in synchronism with the function of the dough divider will be described in the following with reference to the schematic FIGURE 4 showing the dough divider proper (having the same designations as in FIG. 1) and components in connection therewith, as well as a conveyor belt, and also with reference to FIG. 5 showing a horizontal view of the conveyor belt arrangement.

The oscillating motion of rotary valve 29 is effected by means of a rocking lever 37 which is reciprocated by means of a piston rod 38 of a double-acting compressed air cylinder 39, the rod engaging the lever in a transverse direction. Lines 40 and 41 respectively connect the ends of the cylinder 39 with a four-way valve 42 which is supplied with compressed air by pipe G from a source via a check valve actuated by the state of balance of the beater cylinder when the amount of dough in the beater cylinder has become too small. The change of the four-way valve 42 between its two positions is effected by a cam disk 43 driven by a variator 44. By means of the described arrangement, the rotary valve 29 can be reciprocated with a periodicity determined by the adjustment of the variator 44. As appears from the following, the discharge capacity of the dough divider is proportional to said periodicity, rendering it possible to maintain the desired overcapacity of the dough divider relative to the beater cylinder at a minimum value by the feed-back effect of the previously mentioned check valve, and thereby obtain maximum continuity of the operation of the dough divider.

The rocking lever 37 for driving the rotary valve 29 is adapted to actuate in either end position a valve 45 and 46 respectively which via lines 47 and 48 respectively are supplied with compressed air from the previously mentioned source (at H). The outlets of the said valves at C and D respectively are connected by lines (not shown) to the compressed air cylinder of a combined compressed air and oil cylinder 49 (in the lower part of the figure). The compressed air cylinder is of the double-acting type and causes a piston 50 to reciprocate in the cylinder 51 in responsive to the action of the valves 45 and 46 controlled by the rotary valve. The piston 50 has a piston rod 52 in common with a piston 53 in the oil section of the cylinder combination 49, which oil section is also constructed as a double-acting cylinder 54 having its ends via lines 55 and 56 respectively connected with the cylinder ends of the previously mentioned pump 32, thereby acting upon the pump piston 33 and thus upon the diaphragm 30. It appears from the aforesaid that the pump action is in synchronism with the movements of the rotary valve in such a manner that when the rotary valve reaches its shown position blocking the inlet 27 of the dough divider housing, the diaphragm is pressed outwards and maintained in this extended position until the rotary valve is moved to the opposite end position exposing the inlet and the diaphragm is returned to assume its plane condition. During these automatic operations, the previously mentioned steps of drawing, outward pressing and separation of dough portions via the outlet opening 28 of the dough divider housing 26 are effected.

For discharging dough strands onto a conveyor belt with the general designation 57 a nozzle 58 is connected to the outlet 28. In front of the opening of nozzle 58, a cutting means, for example in the form of a yoke 59 with a piano wire 59a stretched between the ends of the downward legs of the yoke, is adapted to be lifted and lowered by means of a piston rod 60 of a double-acting compressed air cylinder 61, which rod engages with the saddle of the yoke. The cylinder is to be driven in synchronism with the movements of the rotary valve. For this purpose, the piston rod 52 in the cylinder combination 49 is drawn through the left end wall (according to the figure) of the cylinder and carries at its end a cam 62 which for one end position of the piston rod actuates a valve 63 and for the other end position a valve 64. The valves 63, 64 are supplied via lines 65 and 66 respectively from a compressed air source at H. The lines 67 and 68 respectively extending from the outlets of the valves communicate, as indicated by corresponding designations, with the connections B and A respectively of the cutting cylinder 61. The cutting of the strand at the opening of the nozzle 58 occurs thus in synchronism with the movement of the rotary valve, more definitely, after the diaphragm 30 was extended and has pressed dough through the outlet opening 28.

For obtaining accurate cutting of the dough strand, the previously mentioned conveyor belt 57 which draws the dough strand from the nozzle 58 is required to make stops in its run during the cutting operation proper. This synchronization, as well as the operation of the belt is also effected by means of the cylinder combination 49. As appears from the figure, the piston rod 52 is also drawn through the right-hand end wall of the cylinder combination and is at its end at 69 pivoted with a rod 70 pivoted at its lower end portion. On the opposite side of point 69 the rod 70 carries a sleeve 71 adapted to be adjusted along the rod, to which sleeve a chain 72 is secured with one end. The other end of the chain runs below and is secured to a point on the circumference of a cog wheel 73 adapted to cooperate with a ratchet wheel 74 on the same shaft, which ratchet wheel is in rigid connection with pulley wheel 75 for the endless conveyor belt 57. The cog wheel 73 is actuated by a weight 76 in a direction opposite to the chain 72. When the rod 70 is moved from the position indicated by dash-dot lines to a position marked by a continuous line, the cog wheel 73 is caused to rotate in a clockwise direction for causing the belt to advance a distance the length of which is determined by the position of the sleeve 71 on the rod 70. When the rod 70 returns to the dash-dot position, the belt is stopped by the ratchet wheel 74 while the cog wheel 73 under the influence of weight 76 turns back. It is to be observed that the cutting movement is commenced at the same moment when the rod 70 reaches the fully drawn position, and that this position is maintained (i.e. the belt remains stopped), due to the synchronization with the pump action until the rotary valve changes position. At the same moment, the cutting yoke 59 is drawn upwards for preparing the next cutting operation which will occur when another dough strand is advanced and the belt is again stopped in the manner described above.

In order to space after cutting the dough strands 36a and 36b from one another, second pulley 77 of the belt 57 is provided with a ratchet mechanism 78 actuated by a double-acting compressed air cylinder 79 having its end sockets A' and B' connected to the same lines 67 and 68 as the cutting cylinder 61. By this arrangement, the pulley 77 is turned forwards a short distance at the same time as the yoke 59 after a completed cutting operation is drawn upwards, the pulley thereby taking along the belt 57 and slackening somewhat the chain 72 which is connected with the first pulley 75.

As appears from the figure, the endless belt 57 is of no greater length than to receive only two consecutive dough strands. For this reason, a second conveyor belt 80 for further conveyance is arranged at a right angle to the first belt 57 and runs immediately below the same. By means of a scraper 81 (FIG. 5) in parallel adjustment with the first belt 57 and extending over a distance corresponding to the length of the two dough strands, the two dough strands are pushed sideways over to the lower continuously operated belt 80. Even this pushing movement must occur when the first belt 57 is inoperative and after the extra displacement was imparted to the two dough strands 36a and 36b. For this purpose, a photo-electric cell 82 may be placed relative to a light source 83 such, that the latter is shielded as soon as the pulley 77 performs its extra advancing movement of the belt 57. The photo-electric cell 82 controls thereby the feeding of connections E and F of a double-acting compressed air cylinder 84, the piston rod 85 of which is directly connected with the scraper 81 which transfers the strands in pairs to the continuously operated belt 80 for further conveyance to the desired place.

What I claim is:

1. A dough beater comprising an elongated cylinder having at one end portion inlets for air and for dough supplied from a dough mixer and at the opposite end portion an outlet, a plurality of working sections positioned one after another axially of said cylinder and communicating with one another through apertures at the end of each section, each working section including an inlet portion having a continuously increasing internal diameter from the inlet and contiguously therewith an outlet portion having a continuously decreasing internal diameter, a rotary shaft extending axially through said cylinder and leaving a free gap between its outer surface and the inside of said apertures, and at least one vane supported by the shaft projecting radially towards the internal surface of the inlet portion of each working section with the edge of said vane being spaced narrowly from the internal surface of the inlet portion and with substantially no part of the edge extending into the outlet portion of the working section.

2. A dough beater as claimed in claim 1 including guide bars extending radially inwardly from the internal surface of the outlet portion of each working section to close proximity to said shaft.

3. The dough beater as claimed in claim 1 in which the rotary shaft is a hollow shaft in connection with an air source and provided with radial channels opening into the inlet portion of each section.

4. The combination with a dough beater as claimed in claim 1 of a dough divider connected from below to the outlet of the cylinder, the divider being defined by a housing with an inlet opening in its upper portion communicating with the cylinder outlet, one side of the lower portion of the housing being provided with a slot extending through the wall of the housing and serving as an outlet for the dough, and the other side being provided with an elastic diaphragm secured in an opening in the wall of the housing and actuated by a pressure medium, the diaphragm being adapted for pressing out intermittently through the outlet slot a definite amount of dough supplied to the housing.

5. The combination as claimed in claim 4 wherein said housing comprises a cylinder arranged transversely relative to the beater cylinder axis, said divider cylinder enclosing a rotary valve of limited mobility mounted within said divider cylinder, said valve having a substantially arcuate surface and a straight surface intersecting said arcuate surface so that in one position of valve rotation said arcuate surface covers the outlet slot thus leaving the beater cylinder outlet open for feeding therethrough dough to the space between the straight valve surface and the diaphragm controlled in synchronism with the valve movement while the diaphragm is not actuated, the valve in its other end position covering such beater cylinder outlet and leaving the outlet slot open for pressing out a part of the included dough by the then actuated diaphragm with the valve on its return to the first-named end position severing the dough between the pressed out part and that remaining in the cylinder.

6. The combination as claimed in claim 5 including a nozzle connected to the outlet slot of the housing for feeding a dough strand to a conveyor belt mounted therebelow with the belt being adapted to be advanced intermittently and in synchronism with the operation of the dough divider, and cutting means located exteriorly of the nozzle for severing the strand while the conveyor belt is inoperative.

7. The combination as claimed in claim 5 wherein the rotary valve is driven from a separate source for continuously reciprocating between its two end positions and the unit comprising the first-named cylinder and dough divider being pivoted for movement between two fixed stops and balanced so that in continuous operation the same normally occupies the boundary position swung downwardly in the direction of the dough divider, said dough divider being arranged such that the same operates with the least possible overcapacity relative to a feed screw of the first-named cylinder, and when said unit is swung upwardly from the lower boundary position, the same actuates a limit switch for stopping the operation of the dough divider and thus the operation of the diaphragm and upon its return to the lower boundary position again actuates the limit switch thereby again placing the dough divider and diaphragm in operation.

8. The combination as claimed in claim 7 including an adjustable counter-weight at the end of the unit located on the side of the pivotal connection opposite the dough divider for controlling the mixing intensity of the dough beater.

References Cited by the Examiner

UNITED STATES PATENTS

| | | | |
|---|---|---|---|
| 1,988,743 | 1/35 | MacKenzie | 259—6 |
| 2,896,556 | 7/59 | Sippel et al. | 107—30 |

WALTER A. SCHEEL, *Primary Examiner.*